United States Patent Office 3,196,144
Patented July 20, 1965

3,196,144
PROCESS FOR PURIFICATION OF PEPTIDES
John T. Sheehan, Middlesex, N.J., assignor to Olin Mathieson Chemical Corporation, New York, N.Y., a corporation of Virginia
No Drawing. Filed Aug. 20, 1962, Ser. No. 218,143
5 Claims. (Cl. 260—112.5)

The present invention relates to an improvement in the process of making useful peptides by means of coupling nitrophenyl esters of amino acids or nitrophenyl esters of peptides with free amino acids or peptides.

One process for preparing peptides involves the coupling of nitrophenyl esters of amino acids or peptides with free amino acids or peptides. This process yields in addition to the desired peptide product, p-nitrophenol, which is regenerated in the course of the formation of the peptide bond from the esters used and becomes a major impurity in the reaction medium. To obtain a suitable useful peptide product the removal of the p-nitrophenol therefrom becomes a necessity. Formerly this was effected by saturating the reaction mixture with sodium bicarbonate and repeatedly extracting the mixture (oftentimes as many as twelve times) with a solvent such as ethyl acetate. Such a procedure particularly in the commercial manufacture of peptides where large quantities of reagents are involved, is tedious, uneconomical and frequently impractical.

The present invention is based on the discovery that the p-nitrophenol obtained in peptide formations, forms a complex with pyridine that is quite insoluble in the reaction mixture, if the reaction medium is made acidic and cold. This complex can then be easily removed by filtration leaving the pure peptide in the filtrate from which it may be easily recovered by adjusting to a more acid pH whereupon it separates from solution in crystalline form.

The insoluble pyridine nitrophenol complex in precipitating out serves not only to remove an undesirable by-product of the peptide synthesis but also serves to clarify the solution and provide a purer product with greater tendency to crystallize—a highly desired characteristic especially as the peptide chain length increases. Moreover, where cost is a factor the p-nitrophenol can be easily regenerated from this complex in a very pure state for reuse.

The process of this invention, therefore, essentially comprises treating the reaction mixture of a nitrophenyl ester of an amino acid or a peptide and a free amino acid or peptide with pyridine at an acidic pH and removing the nitrophenol-pyridine complex which forms. The treatment can be done by carrying out the desired reaction in a pyridine solvent system at a neutral or basic pH and then adjusting the pH to less than 7 preferably about 6.5 to about 5.0 (optimally about 6.2 to about 5.5) as by addition of an acid, such as a mineral acid (e.g., hydrochloric acid and sulfuric acid), or the reaction may be carried out in a different solvent system, such as one employing dimethyl formamide, dioxane, and tetrahydrofuran, either alone or in combination with water, and the pyridine added subsequently with suitable pH adjustment.

Although any electric negatively substituted phenol or thiophenol ester may be used, such as dinitrophenol, dihalophenol, cyanophenol and their thiophenol analogs, the preferred reactants are the p-nitrophenyl esters. The use of such esters with suitable amino acids or peptides is well known in the art.

The following examples illustrate the process of this invention (all temperatures being in centigrade):

EXAMPLE 1

*Benzyloxycarbonyl-glycyl-L-proline*

A solution of 15 g. of L-proline in 320 ml. of a (1:1) pyridine-water mixture is adjusted to pH 9.5 with 5 N sodium hydroxide solution. While maintaining the pH of the medium between 8.5–9.5, 33 g. of benzyloxycarbonyl glycine-p-nitrophenyl ester and 5 N sodium hydroxide are added alternately at room temperature to the reaction medium. After addition is complete the mixture is stirred for an additional hour at room temperature and then cooled in an ice water bath and brought to pH 5–6 with concentrated hydrochloric acid. A precipitate of a complex of pyridine and p-nitrophenol which slowly forms is filtered off and washed with 100 ml. of water. The combined filtrate and washings are again cooled in an ice bath and acidified with concentrated hydrochloric acid to pH 2 (Congo reaction). While the mixture is being stirred, a precipitate slowly forms which crystallizes. The precipitate is filtered off and washed with water. On air drying 23 g. of benzyloxycarbonyl glycyl-L-proline, M.P. 156–157°, (75%) is obtained.

EXAMPLE 2

*Benzyloxycarbonyl-L-prolylgylcine*

A solution of 16 g. of glycine in 400 ml. of a (1:1) pyridine-water mixture is brought to pH 9.5 by adding a small amount of 5 N sodium hydroxide solution. While maintaining the pH between 9–9.5, 59.2 g. of benzyloxycarbonyl-L-proline p-nitrophenyl ester and 5 N sodium hydroxide are added alternately. Following this addition the reaction mixture is stirred for two hours at room temperature and then cooled in an ice bath and brought to pH 5–6 by the addition of concentrated hydrochloric acid. The pyridine-nitrophenol complex forms slowly and is filtered off and washed with a small volume of water. After drying it weighs 38 g. and melts at 61–62°. The original filtrate and washings are combined and made acid to Congo red by the addition of concentrated hydrochloric acid. On standing in the cold (5°) a solid product separates. Filtered off, washed with water and air dried it melts at 126° and weights 38 g. (78%).

EXAMPLE 3

*Benzyloxy-L-phenylalanylglycyl-L-proline*

Forty grams of glycyl-L-proline is a dissolved in 600 ml. of a (1:1) mixture of pyridine and water. The solution is adjusted to about pH 10 by the addition of a small amount of 5 N sodium hydroxide solution. While maintaining the pH between 8.5–9.5 at room temperature, 84 g. of p-nitrophenyl benzyloxycarbonyl-L-phenylalanate and 5 N sodium hydroxide solution are alternately added while stirring. After the addition, the mixture is stirred for the hour and then cooled in an ice bath while the pH is brought to between 5–6 by the addition of concentrated hydrochloric acid. The pyridine-nitrophenol complex slowly crystallizes out. It is filtered off and washed with water. On drying it weighs 35 g. and melts at 60–62°. The combined filtrate and washings are acidified below pH 2 and a sticky precipitate separates out which granulates on standing. The insoluble product is filtered off and suspended in water and refiltered. On drying in air 90 g. of material, M.P. 206°, is obtained. Crystallized once from alcohol it melts at 211–213°.

*Analysis.*—Calcd. for $C_{24}H_{27}N_3O_6$: C, 63.56; H, 6.00; N, 9.27. Found: C, 63.30; H, 6.03; N, 9.28 $[\alpha]_D^{28°}$ —62.6 (c. 1 DMF).

EXAMPLE 4

*Benzyloxycarbonyl-glycylglycyl-L-proline*

To a solution of 15 g. of L-proline in 320 ml. of a (1.1) pyridine-water mixture, a sodium hydroxide solution is added to obtain a pH of 9.5. While maintaining this pH with periodic addition of alkali, 39 g. of benzyloxcarbonyl glycylglycine p-nitrophenyl ester is added with stirring at room temperature. After the addition is complete the mixture is stirred for an additional hour at room temperature and then cooled in an ice water bath and acidified to pH 5–6 with hydrochloric acid. A complex of pyridine and p-nitrophenol slowly crystallized out of the solution. The insoluble complex is filtered off and washed with a small volume of water. The air-dried complex melts at 60–62° and weighs 20 g. The combined filtrate of the mother liquor and washings from above are again cooled in an ice water bath and made acid to Congo paper when the protected peptide acid sperates and gradually solidified. Filtered off, washed and dried it melts at 137°.

EXAMPLE 5

*N,α-benzyloxycarbonyl-nitro-L-arginylglycylglycyl glycylglycine*

A mixture of 20 g. of glycylglycyl glycine, 53 g. of benzyloxycarbonyl - nitro-L-arginylglycine p - nitrophenyl ester and 2 ml. of triethyl amine are dissolved in 500 ml. of dimethylformamide and stirred at room temperature for four hours. The mixture is then diluted with 360 ml. of a (1.1) pyridine-water mixture, cooled in an ice water bath and acidified to pH 6. On standing at 5° after seeding, a complex of pyridine and p-nitrophenol slowly separates. It is filtered off, washed with water and air dried. It weighs 20 g. and melts at 60–62°. The filtrate and washings are combined and diluted with 2-liters of water. On acidification to pH 2 the product separates and solidifies.

EXAMPLE 6

*Benzyloxycarbonyl-glycyl-L-proline*

A mixture of 15 g. of L-proline, 33 g. of benzyloxycarbonyl glycine p-nitrophenyl ester and 20 ml. triethyl amine is dissolved in 200 ml. of dimethylformamide and stirred at room temperature for twelve hours. The mixture is then diluted with 320 ml. of a (1:1) pyridine-water mixture and cooled in an ice water bath. On acidification to pH 5.5, a complex of pyridine and p-nitrophenol slowly crystallizes out. It is filtered off and washed with a small volume of water and air dried. It melts at 60–61°. The combined filtrate and washings are brought to pH 2 and diluted to two liters with water. The oil which separates gradually solidified on standing at 5°. It is filtered off and washed with water. On drying in air, it melts at 158° and weighs 18 g.

EXAMPLE 7

*N,α-benzyloxycarbonyl-nitro-L-arginyl-L-prolyl-L-prolyl-glycine*

A solution of 20 g. of L-prolylglycine dissolved in 320 ml. of a (1:1) pyridine-water mixture is adjusted to pH 9.5 with sodium hydroxide solution and to it alternately, at room temperature with stirring, is added 57 g. of benzyloxy carbonyl-nitro-L-arginyl-L-proline p-nitrophenyl ester and enough sodium hydroxide solution to maintain the above pH to insure complete coupling with the p-nitrophenyl ester. After the complete addition of the ester the reaction is stirred for an additional hour and then cooled in an ice bath. The solution is brought to pH 5.2 with the addition of hydrochloric acid. After seeding, the pyridine-p-nitro-phenol complex slowly crystallizes out. This is filtered off and washed with water. On air drying it melts at 60–62° and weighs 20 g. The combined filtrate and washings from above are cooled in an ice water bath and acidified to Congo reaction. The peptide acid slowly separates and solidifies. It is filtered off, washed and dried.

EXAMPLE 8

*Benzyloxycarbonylglycyl-L-proline*

A mixture of 20 g. sodium-L-prolinate and 36 g. of N-benzyloxycarbonyl glycine thiophenyl ester in 320 ml. of (1:1) pyridine-water mixture is heated with stirring at 60° for four hours. The solution is then cooled in an ice water bath and acidified to pH 5–6 with concentrated hydrochloric acid. On standing a precipitate of a complex of pyridine-thiophenol slowly forms. The filtrate is again cooled in an ice bath and brought to pH 2 with concentrated hydrochloric acid yielding an oil which quickly solidifies. Filtered off, washed with water and air dried the product melts at 155°.

EXAMPLE 9

*Benzyloxycarbonylglycyl-L-proline*

A solution of 15 g. of L-proline in 320 ml. of (1:1) pyridine water is adjusted to pH 9.5 by the addition of 2 N sodium hydroxide. While maintaining this pH 37.5 g. of N-benzyloxycarbonyl glycine-2,4-dinitrophenyl ester and alkali are alternately added. After the addition the mixture is stirred one hour at room temperature and then cooled in an ice-water bath. The solution is adjusted to pH 6 by adding concentrated hydrochloric acid. On standing a precipitate of complex of pyridine 2,4-dinitrophenol slowly forms. It is filtered off and dried, M.P. 79–80°. The filtrate is again cooled in an ice bath and acidified to pH 2 when an oil separated which quickly solidifies. Filtered off, washed with water and air dired, it melts at 155–156°.

EXAMPLE 10

*Benzyoxycarbonyl-L-propylglycine*

This compound is prepared as described in Example 2 by substituting benzyloxycarbonyl-L-proline 2,4-dichlorophenyl ester for benzyloxycarbonyl-L-proline p-nitrophenyl ester.

EXAMPLE 11

*Benzyloxycarbonylglycyl-L-proline*

This compound is prepared as described in Example 1 except that benzyloxycarbonyl glycine p-cyanophenyl ester is substituted as the acylating agent.

EXAMPLE 12

*Benzyloxycarbonylglycyl-L-proline*

This compound is prepared as described in Example 1 except that benzoxycarbonyl glycine, p-nitrothiophenyl ester is substituted as the acylating agent.

What is claimed is:

1. A process for preparing peptides which comprises interacting a compound selected from the group consisting of the nitrophenyl ester of an amino acid and the nitrophenyl ester of a peptide with a compound selected from the group consisting of a free amino acid and a peptide in the presence of pyridine, and acidifying the reaction medium whereby the peptide remains in solution and a pyridine-nitrophenol complex precipitates from solution.

2. The process of claim 1 wherein the nitrophenyl ester is the p-nitrophenyl ester.

3. A process for preparing peptides which comprises interacting a compound selected from the group consisting of the nitrophenyl ester of an amino acid and the nitrophenyl ester of a peptide with a compound selected from the group consisting of a free amino acid and a peptide, adding to the reaction medium pyridine and adjusting the pH of the medium to an acidic pH of from about 5.0 to 6.5 whereby a precipitate of the nitrophenol and pyridine is obtained.

4. In the process for preparing peptides by reacting an electronegatively substituted phenyl ester of an amino acid or peptide, said substituted phenyl being selected from the group consisting of nitrophenyl, halophenyl, cyanophenyl and thiophenyl, with a compound selected from the group consisting of a free amino acid and peptide whereby phenol by-product is formed, the improvement which comprises removing the by-product by complexing it with pyridine at an acidic pH whereby the peptide remains in solution and the by-product complex precipitates.

5. A process in accordance with claim 4 wherein the phenol by-product formed is precipitated at a pH of from about 5.0 to 6.5.

No references cited.

WILLIAM H. SHORT, *Primary Examiner.*

JAMES A. SEIDLECK, *Examiner.*